United States Patent [19]
Carosa

[11] Patent Number: 5,491,622
[45] Date of Patent: Feb. 13, 1996

[54] POWER CONVERTER WITH EMERGENCY OPERATING MODE FOR THREE PHASE INDUCTION MOTORS

[75] Inventor: Paul F. Carosa, Los Angeles, Calif.

[73] Assignee: Delco Electronics Corp., Kokomo, Ind.

[21] Appl. No.: 178,988

[22] Filed: Jan. 7, 1994

[51] Int. Cl.$^6$ ................................................. H02H 7/122
[52] U.S. Cl. ......................... 363/56; 363/98; 363/132
[58] Field of Search .......................... 363/56, 98, 132, 363/58; 361/23, 30, 31, 33; 318/798, 800, 801, 802, 811, 812

[56] References Cited

U.S. PATENT DOCUMENTS

| | | | |
|---|---|---|---|
| 4,507,724 | 3/1985 | Glennon | 363/98 |
| 4,567,553 | 1/1986 | Foch et al. | 363/98 |
| 4,959,596 | 9/1990 | MacMinn et al. | 318/254 |
| 5,008,801 | 4/1991 | Glennon | 363/132 |
| 5,136,452 | 8/1992 | Orton | 363/33 |
| 5,280,421 | 1/1994 | De Doncker et al. | 363/98 |
| 5,298,848 | 3/1994 | Ueda et al. | 318/811 |

*Primary Examiner*—Peter S. Wong
*Assistant Examiner*—Adolf Berhane
*Attorney, Agent, or Firm*—L. Lum; M. A. Navarre

[57] ABSTRACT

A DC-to-AC power converter that is used to drive a three-phase motor while providing for fail soft and emergency operation. The power converter employs a conventional three half-bridge arrangement of power poles and adds a fourth pole to provide for an emergency operation in the event of failure of one of the three normal poles. The fourth (emergency operation) pole is coupled between a pulse width modulated controller and the neutral wire of the motor and is powered by first and second DC power busses. The controller is configured to disable a failed one of the three normal poles, and to control the fourth pole subsequent to disabling of the failed pole. Fuses or other disconnect devices are also added between the three normal poles and the respective windings of the motor. The present power converter allows continued motor operation at a reduced power level in the event of a failure of one of the power poles. The present invention has application to electric vehicle power systems and may be used in a critical process where temporary operation must be maintained.

10 Claims, 2 Drawing Sheets

1

POWER CONVERTER WITH EMERGENCY OPERATING MODE FOR THREE PHASE INDUCTION MOTORS

BACKGROUND

The present invention relates generally to control circuits for induction motors, and more particularly, to a power converter for use with induction motors that provides for emergency operation and fail soft operating characteristics.

A block diagram of a prior art power converter structure is shown in FIG. 1, and is illustrated for comparative purposes. In normal operating mode, this circuit converts DC input power to three-phase AC power with regulated output voltage or currents, to control and drive a three-phase motor, such as an induction motor or brushless DC motor. With reference to FIG. 1, a fail soft mode of operation of this converter is achieved by connecting the neutral point of a three-phase Y-connected motor by way of a triac to a voltage that is midway between +DC and −DC input buses. However, the disadvantages of the circuit include the following: capacitors C2 and C3 carry very large currents when operating and must be physically large; resistors R1 and R2 cause additional power losses; emergency-mode operation is only possible if a power switch fails in an open circuit condition, not in a short-circuit condition.

Consequently, it is an objective of the present invention to provide for a power converter for use with a three phase induction motor that overcomes the above disadvantages, and provides for fail soft operation in the event of any type of failure of the power switches.

SUMMARY OF THE INVENTION

In order to provide for the above objectives and other features and advantages, the present invention is a DC-to-AC power converter that is used to drive a three-phase motor. The present power converter, in addition to using a conventional three half-bridge arrangement of power switching poles (transistors that operate as switches) that are normally present in a power converter, a fourth pole is added to provide for an emergency operating mode in the event of failure of one of the three normal switching poles.

More particularly, the fourth power switching pole (for emergency operation) is coupled between a pulse width modulation (PWM) controller and a neutral wire of a motor and is coupled to first and second DC power busses. The pulse width modulation controller is configured to disable a failed one of the three normal switching poles, and to control the fourth switching pole subsequent to disabling of the failed switching pole. Fuses or other mechanical disconnect devices are also added between the three normal switching poles and the respective windings of the motor.

The power converter of the present invention allows continued operation of the motor at a reduced power level in the event of a failure of one of the power semiconductor switches that comprise the normal switching poles. For example, an electric vehicle employing the power converter of the present invention would be able to "limp-home" if one of the power switching poles failed in a short or open condition. Another application of the present invention is for a motor/converter used in a critical process where temporary operation must be maintained.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
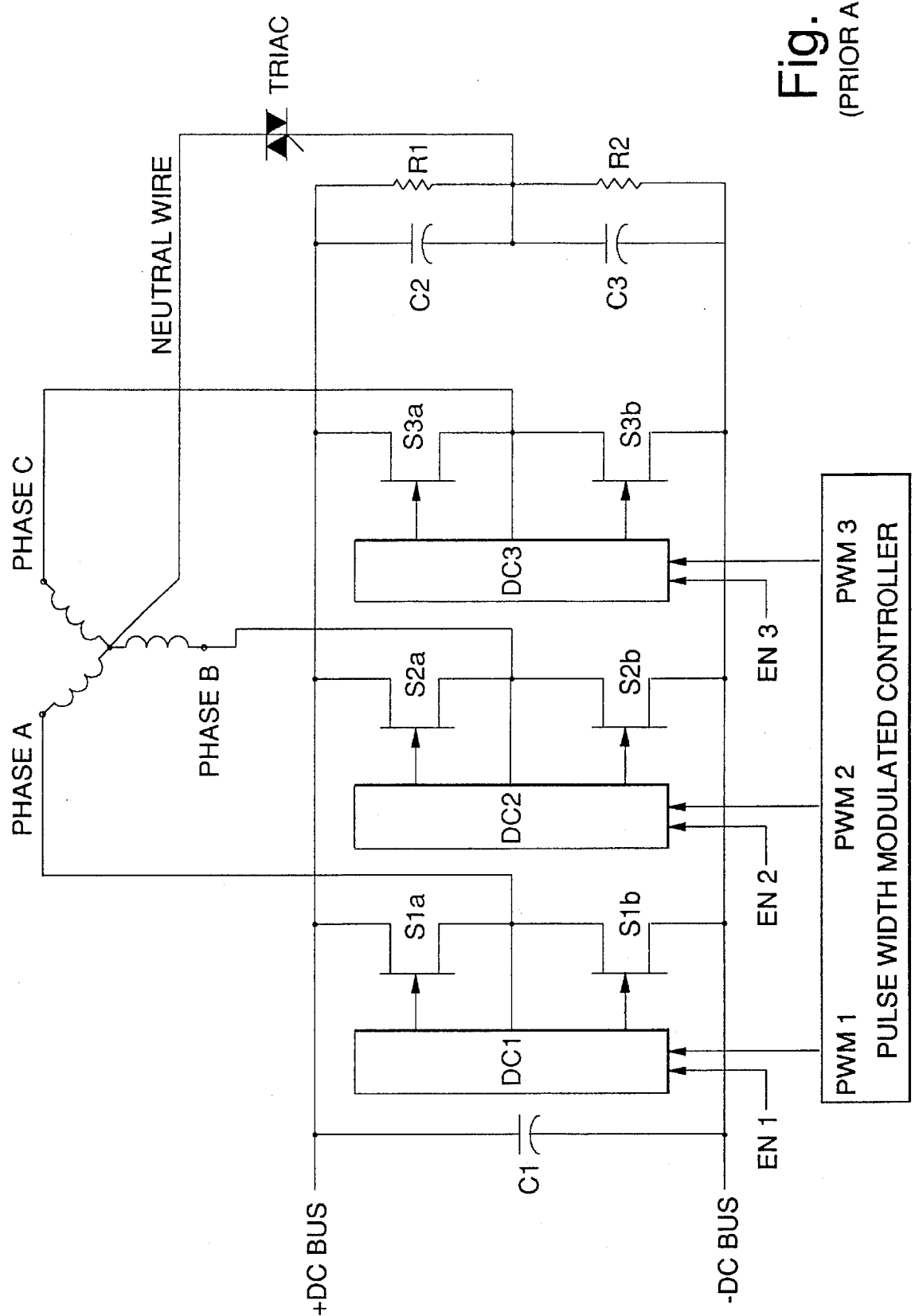
FIG. 1 illustrates a conventional power converter.

With reference to the drawing figures, FIG. 1 illustrates the prior art power converter that was generally described in the Background section. In this prior art power converter, capacitors C2 and C3 must carry large motor currents and thus are very large, and resistors R1 and R2 introduce additional power losses into the power converter. Emergency-mode operation is only possible if a power switch fails in an open circuit condition, not in a short-circuit condition. This limits the usefulness of this conventional power converter. The present invention is adapted to overcome the limitations of this circuit design.

Figure 2:
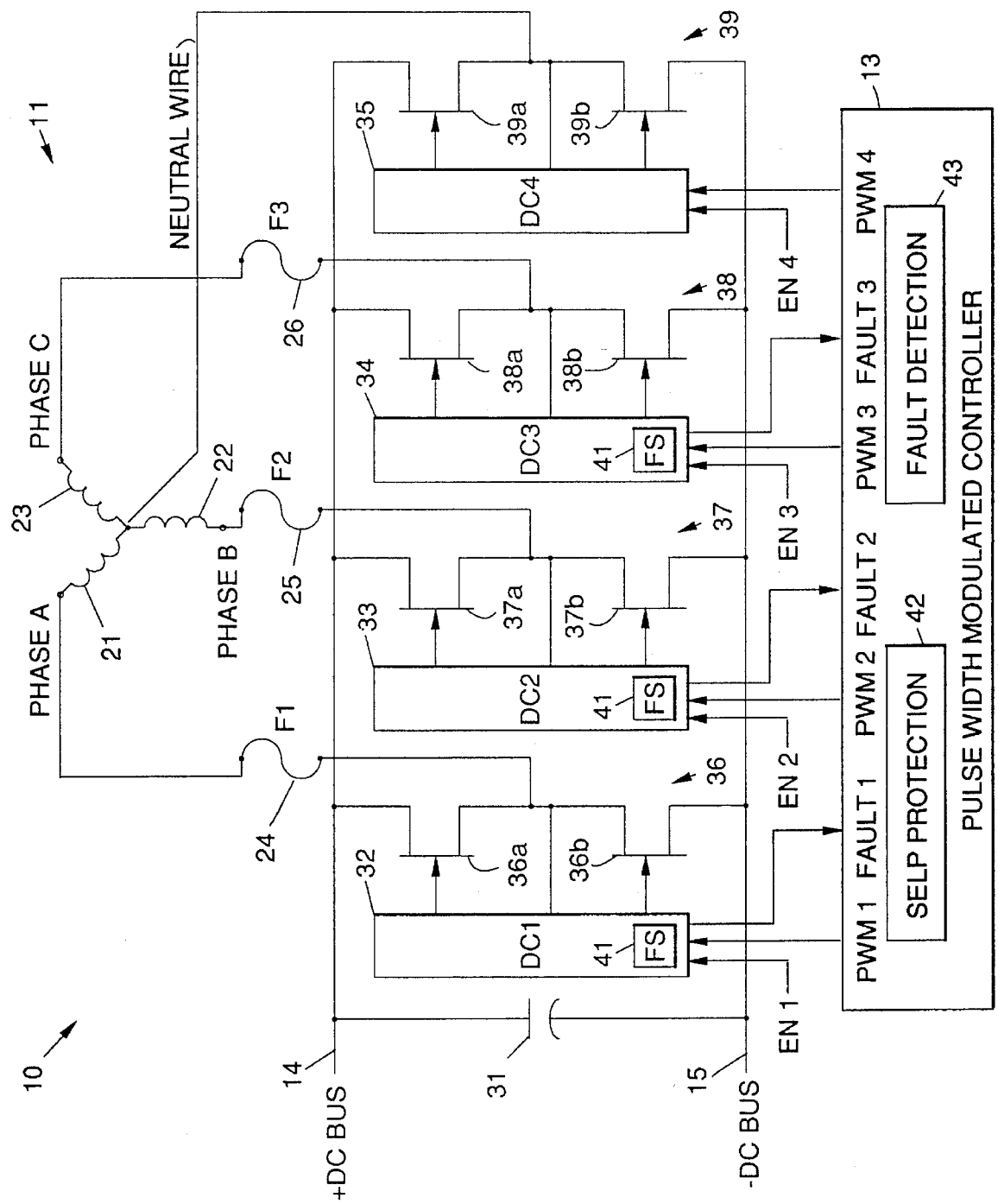
FIG. 2 illustrates a power converter in accordance with the principles of the present invention.

FIG. 2 shows a schematic diagram of a DC-to-AC power converter 10 in accordance with the principles of the present invention. FIG. 2 shows the power converter 10 coupled to three-phase motor windings 21, 22, 23 of a three-phase motor 11. The power converter 10 is comprised of four switching poles 36, 37, 38, 39, that comprise four sets of power semiconductor switches 36a, 36b, 37a, 37b, 38a, 38b, 39a, 39b, such as IGBTs, Darlington bipolar transistors or MOSFETs, for example. The first three switching poles 36, 37, 38 are conventional as had been described above.

The fourth switching pole 39 comprises an emergency operation pole 39 in accordance with the principles of the present invention. Power for the power converter 10 is provided by +DC and −DC power busses 14, 15 and is filtered using a filter capacitor 31 at the input of the power converter 10. The power busses 14, 15 are coupled to respective power semiconductor switches 36a, 36b, 37a, 37b, 38a, 38b, 39a, 39b comprising the switching poles 36, 37, 38, 39 of the power converter 10. The power semiconductor switches 39a, 39b of the fourth pole 39, may be lower current rated transistors than the switches of the other three switching poles 36, 37, 38 to save cost and size if operation at further reduced power levels is allowed.

The four sets of switches 36a, 36b, 37a, 37b, 38a, 38b, 39a, 39b, comprising the four switching poles 36, 37, 38, 39 are switched in a pulse width modulated fashion to control phase currents or voltages applied to the motor 11. The pulse width modulation switching is achieved using a pulse width modulation controller 13 that is coupled to four drive circuits 32, 33, 34, 35 (designated as DC1, DC2, DC3, DC4) that are coupled to each set of power semiconductor switches 36a, 36b, 37a, 37b, 38a, 38b, 39a, 39b.

The first set of power semiconductor switches 36a, 36b, comprise a first pole 36 that drives phase A of the motor 11. The first set of power semiconductor switches 36a, 36b are switched fully on or off in a complimentary fashion by the first drive circuit 32 (DC1). The switching frequency and duty cycle are controlled by a pulse width modulated signal (PWM 1) provided by the controller 13. The first switching pole 36 is enabled and disabled by a first enable signal (EN 1). When disabled, the first drive circuit 32 coupled to the first set of power semiconductor switches 36a, 36b is turned off. The first drive circuit 32 (DC1) also contains a fault sensing circuit (FS) 41 which detects when the pole output voltage (motor phase voltage) is not switching properly. If a fault is detected, the fault sensing circuit 41 sends a signal to the controller 13 which must change to the emergency operation mode, for continued operation.

In a similar manner, the second set of power semiconductor switches 37a, 37b, form the second switching pole 37 that drives phase B of the motor 11, and the third set of power semiconductor switches 38a, 38b, form the third switching pole 38 that drives phase C of the motor 11. In accordance with the principles of the present invention, the fourth switching pole 39, comprising power semiconductor switches 39a, 39b, is coupled between the fourth drive circuit 35 and the neutral wire of the motor 11.

In normal (conventional) operating mode, the fourth set of power semiconductor switches 39a, 39b are disabled and no current flows in the neutral wire. Pulse width modulated signals (PWM 1, PWM 2, PWM 3) are provided to the first, second, and third power switching poles 36, 37, 38 by the controller 13. If one of the power semiconductor switches 36a, 36b, 37a, 37b, 38a, 38b in any of the first three power switching poles 36, 37, 38 should fail in either an open or shorted manner, normal motor operation would not continue. If the first switch 36a failed by shorting, for example, the drive circuit 32 (DC1) detects an over-current when the second power semiconductor switch 36b turns on, and a self-protection circuit 42 in the controller 13 turn-off the second power semiconductor switch 36b to cease inverter operation. A fault detection circuit 43 is used as part of the controller 13 to indicate which pole has failed.

The power converter 10 of the present invention includes disconnect devices 24, 25, 26 or fuses 24, 25, 26 (F1, F2, F3) in each of the phase lines coupled to the motor 11. These fuses 24, 25, 26 may be a mechanical contactor or disconnect mechanism, as well as a conventional fuse, for example. The important point is that a failed switching pole (the first pole 36 in the above illustrated operating mode) must be disconnected from the motor 11. If fuses 24, 25, 26 (F1, F2, F3) are used as the disconnect devices 24, 25, 26, a particular fuse 24 may be intentionally opened by turning on an appropriate switch 36a, 36b, 37a, 37b, 38a, 38b, 39a, 39b. For example, if it is desired to clear the first fuse 24 (F1) to disconnect the first pole 36 from the motor phase A winding 21 and if the fault sensing circuit 41 has determined that the first switch 36a has failed short, then switches 37b, 38b, 39b may be turned on until the the first fuse 24 (F1) clears. After the failed switching pole 36 is detected and disconnected from the motor 11, it is disabled and the emergency-mode pole, comprising the fourth pole 39, is enabled. For example, if the first switching pole 36 fails and is disconnected, no current flows in phase A of the motor, but in emergency-mode, the currents in phase B, phase C and the neutral wire provide a two-phase operating mode for the motor 11.

By controlling the current amplitudes and phases in the operational windings and neutral wire, the motor 11 can continue to operate with smooth torque in either the positive or negative torque regions of operation. This is accomplished by programming the controller 13 for the emergency operating mode. Such programming is generally well known in the art. For long term operation, the output power level of the motor 11 is limited to 50% of full rated current.

Thus, the present DC-to-AC power converter 10 may be used to drive a three-phase motor 11 wherein a fourth switching pole 39 is added to provide for emergency operation in the event of failure of one of the three normal switching poles 36, 37, 38. The present power converter 10 allows continued operation of the motor 11 at a reduced power level in the event of a failure of one of its switching poles 36, 37, 38. The present DC-to-AC power converter 10 may be used in an electric vehicle, for example, and would permit the vehicle to "limp-home" if one of the power switches 36a, 36b, 37a, 37b, 38a, 38b failed in a short or open condition. The concepts of the present invention may also be employed in a motor/converter used in a critical process where temporary operation must be maintained.

Thus, there has been described a new and improved power converter for use with induction motors that provides for emergency operation and fail soft operating characteristics. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A power converter for use with a three-phase motor having a neutral wire, and wherein the power converter comprises a pulse width modulation controller that is coupled to three switching poles by means of individual drive circuits, which switching poles are respectively coupled to the winding of each phase of the motor and are separately controlled by the individual drive circuits, and wherein the switching poles are powered by first and second DC power busses coupled thereto, wherein the improvement comprises:

an emergency operation pole coupled between the controller and the neutral wire of the motor and which is coupled to the first and second DC power busses, and wherein the controller is configured to disable a failed one of the three switching poles, and to control the emergency operation pole subsequent to disabling of the failed switching pole.

2. The power converter of claim 1 which further comprises disconnect device coupled between each of the three switching poles and respective windings of the motor.

3. The power converter of claim 2 wherein the disconnect device comprises a fuse.

4. The power converter of claim 1 wherein the controller further comprises a self-protection circuit that is adapted to turn-off a failed switching pole.

5. The power converter of claim 1 wherein the controller further comprises a fault detection circuit to indicate a failed one of the three poles.

6. Apparatus comprising:

a three-phase motor having a neutral wire and three windings;

a power converter coupled to the three-phase motor that comprises:

three switching poles individually coupled to the three windings of the motor;

three drive circuits individually coupled to the three switching poles;

first and second DC power busses coupled to the switching poles; and an emergency operation switching pole coupled to the neutral wire of the motor and coupled to the first and second DC power busses; and a pulse width modulation controller individually coupled to the three drive circuits and to the emergency operation switching pole, and wherein the controller is configured to disable a failed one of the three switching poles, and to control the emergency operation pole subsequent to disabling the failed switching pole.

7. The apparatus of claim 6 which further comprises disconnect means coupled between each of the three switching poles and respective windings of the motor.

8. The power converter of claim 7 wherein the disconnect device comprises a fuse.

9. The apparatus of claim 6 wherein the controller further comprises a self-protection circuit that is adapted to turn-off a failed switching pole.

10. The apparatus of claim 6 wherein the controller further comprises a fault detection circuit to indicate a failed one of the three poles.

* * * * *